Jan. 17, 1967 W. H. JOHNSON 3,298,523
GRAVITY FILTER AND BACKWASH CONTROL VALVE
Filed May 14, 1964
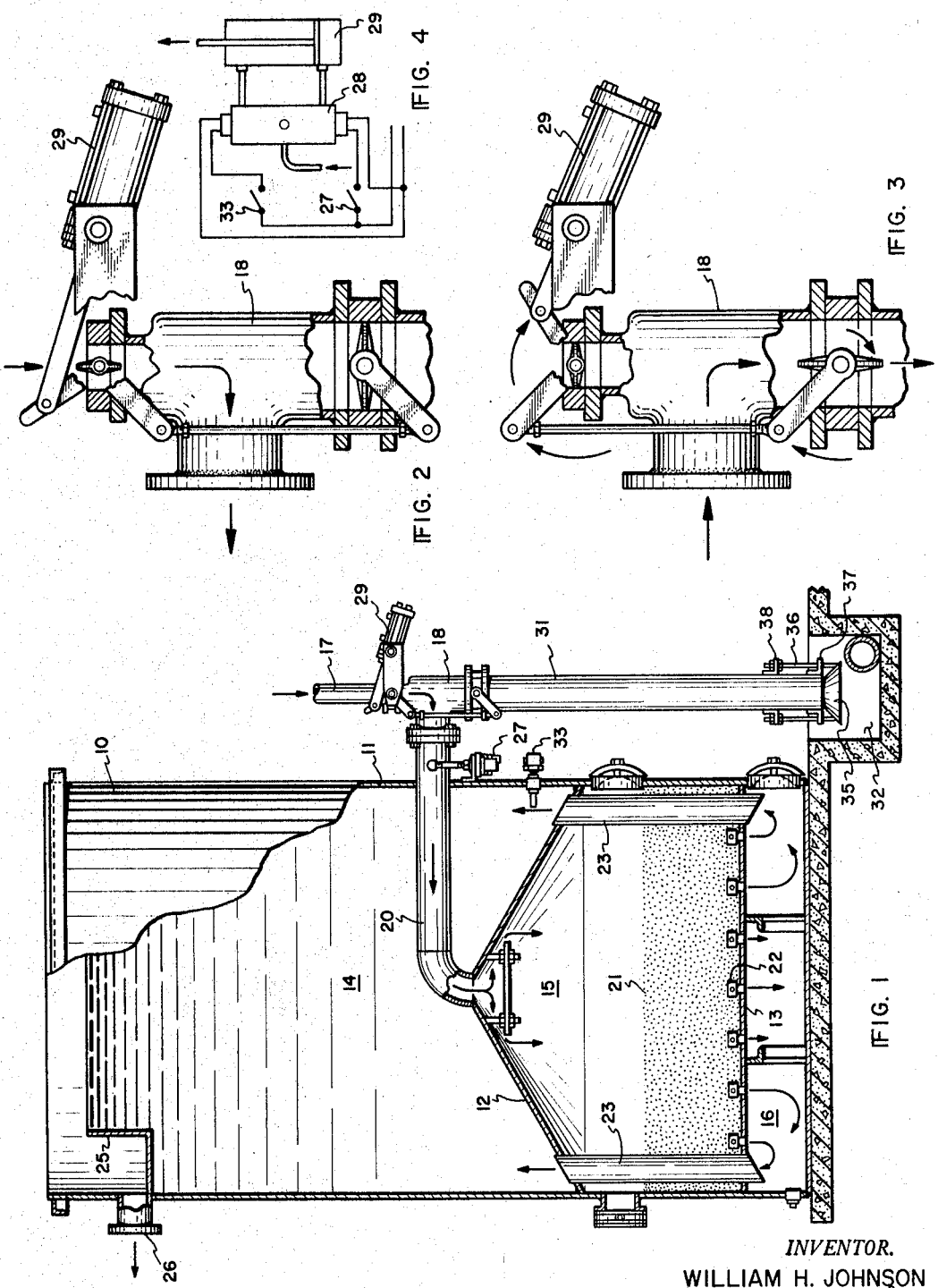
INVENTOR.
WILLIAM H. JOHNSON
BY Robert W. Habel
ATTORNEY

United States Patent Office 3,298,523
Patented Jan. 17, 1967

3,298,523
GRAVITY FILTER AND BACKWASH
CONTROL VALVE
William H. Johnson, Mountain View, Calif., assignor to
The Eimco Corporation, Salt Lake City, Utah, a corporation of Delaware
Filed May 14, 1964, Ser. No. 367,405
5 Claims. (Cl. 210—104)

This invention relates generally to gravity filters of the type employing means for alternately changing from a filter cycle to a backwash cycle for cleaning the filter medium and particularly to filters in which the backwash flow is removed via a portion of the influent conduit to a waste discharge outlet.

Gravity filters of this type generally comprise a tank divided into a lower filtering compartment having a sand bed or other granular material as the filter media and an upper backwash storage compartment. Whenever the filter media becomes so clogged with solids or other impurities that the head through the filter is substantially reduced, the flow is reversed, draining previously filtered water from the backwash storage compartment back through the filter media and either directly to a waste discharge line or via a portion of the inlet line connected to the waste discharge line. The raw water inlet line remains open throughout and the inlet water is routed directly to the waste line along with the backwash water resulting in a substantial loss of feed water. This has proved to be a very wasteful feature of such filtering apparatus. Moreover, adding the inlet water to the backwash water diminishes the carrying capacity of the waste discharge line, causing head loss to the waste line and reducing the effectiveness of the wash water with its limited head capacity.

Accordingly, it is an object of this invention to provide simple, efficient means for effecting the change of cycles in gravity filters while preventing loss of feed water during the backwash cycle and reduction in backwash head to the discharge line.

Another object of this invention is to provide automatic control means for alternately changing from the filter cycle to the backwash cycle in gravity filters.

Briefly, the invention comprises a gravity filter of the type described provided with thru-way valve means placed in the junction formed by the influent conduit, waste discharge conduit and common backwash-influent conduit enabling the influent line to be open during filtering and closed during backwash, while conversely the waste discharge line to be closed during filtering and open during backwash, and further the combination with automatic control means sensitive to head loss through the filter bed and the level of the backwash liquid whereby proper positioning of the valve means is alternately effected regulating the entire operating cycle of the filter.

In order that the invention may be more readily understood and carried into effect, reference is made to the accompanying drawing which is offered by way of example only and not in limitation of the invention, the scope of which is defined by the appended claims rather than by the description preceding them.

FIG. 1 is a side view of a filter embodying the invention certain parts being shown in section and others in elevation for purposes of clarity.

FIG. 2 is an enlarged side view of the three-way valve used in the apparatus of FIG. 1 certain parts cut away showing the position during filtration.

FIG. 3 is a view similar to FIG. 2 except that the valve is shown in the backwash position.

FIG. 4 is a schematic diagram illustrating a preferred embodiment of the circuit and automatic control elements for operating the valve.

Referring to FIGS. 1–3, the filter comprises a tank generally designated 10, having an upstanding sidewall 11, divided by transverse partitions 12 and 13 into an upper backwash water storage compartment 14, intermediate filter compartment 15 and underdrain area 16.

During the filtering cycle water containing suspended solids and other impurities is introduced to the filter chamber from feed conduit 17 through three-way valve 18 and conduit 20. Valve 18 is set as illustrated in FIG. 2 with the upper orifice open and lower orifice closed to prevent loss to the waste drain. The raw water thus entering the filter chamber 15 passes downwardly through filter media bed 21, which may be sand or other suitable granular material, through strainers 22 and into underdrain area 16. Impurities and other foreign matter are trapped in the sand bed so that only freshly filtered water enters underdrain area 16.

From area 16 filtered water passes upwardly through transfer conduits 23 into compartment 14 in which a head of water is maintained for backwash purposes. In the illustrated embodiment, the upper level of the backwash water is set by overflow weir box 25 from which effluent is discharged through conduit 26.

The backwash operation of the filter is instituted in the following manner. As noted, during filtration sand bed 21 collects impurities which after a period of time impede the flow of water therethrough reducing the head through the filter and increasing the back pressure. With particular reference to FIG. 4, when the loss of head reaches a predetermined level, pressure switch 27 in conduit 20 automatically closes, energizing normally closed solenoid-operated four-way air valve 28 allowing air to pass to pneumatic cylinder 29 driving the piston therein down and in turn closing the upper orifice of three-way valve 18 while simultaneously opening the lower orifice, as shown in FIG. 3.

Three-way valve 18 is thus in the backwash position with raw water inlet 17 closed and waste discharge conduit 31 open and hence in communication with common backwash-influent conduit 20. Reversal of flow commences immediately with filtered water from storage compartment 14 passing upwardly through the filter bed via strainers 22, carrying foreign matter and impurities with it, through conduit 20 to waste discharge line 31 and into drain sump 32. Backwash continues until the water level in compartment 14 actuates low level switch 33 whereupon switch 33 closes, energizing solenoid air valve 28 and pneumatic cylinder 29, and thus reversing the position of valve 18 (FIG. 2) so that raw water is again directed to the filter chamber. In the illustrated embodiment, switch 33 may either be pressure or float actuated. Also, while the preferred system for operating three-way valve 18 is the electric and pneumatic control elements illustrated in FIG. 4, an hydraulic solenoid valve may be substituted for solenoid air valve 28 or the whole system may be electrically controlled employing an electrically operated valve positioner in place of the air cylinder 29.

In some applications it is desirable to maintain positive control over the rate of flow during backwash. To this end there is provided at the outlet end of discharge conduit 31 a backwash rate control cone 35 extending into the outlet and mounted for up and down adjustment. Depending rods 36 on cone 30 extend vertically through guide brackets 37 and holding brackets 38. The ends of rods 36 are threaded and secured to brackets 38 by paired lock nuts. The rate of discharge is varied by moving the position of the lock nuts on rods 36 so as to raise or lower cone 35 and thereby change the outlet area of discharge conduit 31.

Alternately, the backwash rate may be changed by adjusting the linkage on the lower butterfly of valve 18 such that the backwash rate is regulated by the amount it opens.

As is evident from the foregoing, novel ways and means are provided for maintaining the entire operation of a backwash filter completely automatic, with backwash instituted whenever the filter media becomes clogged. Since the inlet line is always closed as soon as the flow is reversed no influent water is lost to waste. Also important, the capacity of conduit 31 is not diminished by influent water since it is devoted entirely to carrying backwash water thereby using the backwash water head to the fullest.

It can thus be seen that the apparatus of this invention provides a positive control over filtering, saving considerable water and affording an increase in backwash potential hitherto unavailable with gravity filter apparatus.

What is claimed is:

1. A gravity filter adapted to be cycled sequentially through filtering and backwashing phases comprising
   a filter section;
   an underdrain section below said filter section;
   a backwash liquid storage section above said filter section;
   an effluent withdrawal conduit in communication with said underdrain section;
   a common backwash-influent conduit connected to the upper side of said filter section;
   an influent conduit connected to an influent source at one end and to said common backwash-influent conduit at the other end;
   a backwash discharge conduit connected to said common backwash-influent conduit at the juncture of said common conduit with said influent conduit and having a discharge end at the other end;
   a three-way valve means at the juncture of said influent, discharge and common backwash-influent conduits for closing the influent conduit while opening the backwash discharge conduit when the filter is on a backwashing phase and for closing the backwash discharge conduit while opening the influent conduit when the filter is on a filtering phase;
   pressure sensitive switch means in communication with said common backwash-influent conduit for sensing pressure build-up in said conduit;
   liquid level sensitive switch means located in a lower portion of said backwash storage section at an elevation below said three-way valve means and above the discharge end of said discharge conduit; and,
   actuator means operably connected to said valve to operate the valve responsive to the position of said pressure sensitive switch means and said liquid level sensitive switch means, said actuator means adapted to position the valve to a backwashing phase when the pressure sensitive switch means is actuated, and to reposition the valve to a filtering phase when the liquid level sensitive switch means is actuated.

2. A gravity filter according to claim 1 wherein said three-way valve includes an upper butterfly valve to control the influent conduit and a lower butterfly valve to control liquid flow to the backwash discharge conduit, said lower butterfly including means to adjust said valve to control the rate of backwash flow.

3. A gravity filter according to claim 1 further comprising a backwash rate control cone, said cone positioned with its apex inserted into the discharge end of said discharge conduit.

4. A gravity filter according to claim 1 wherein said actuator means comprises a solenoid air valve operative in response to the positions of said pressure switch means and said liquid level switch means, and a pneumatic cylinder operably connected to said air valve and said three-way valve.

5. A gravity filter according to claim 4 wherein said three-way valve comprises an upper butterfly valve to control backwash egress through the backwash discharge conduit, and a common linkage connecting the two valves whereby a single pneumatic cylinder effects actuation of the entire three-way valve.

References Cited by the Examiner

UNITED STATES PATENTS

| | | | |
|---|---|---|---|
| 630,988 | 8/1899 | Reisert | 210—108 |
| 656,043 | 8/1900 | Paterson | 210—108 |
| 2,879,891 | 3/1959 | Beohner et al. | |
| 3,193,099 | 7/1965 | Soriente et al. | 210—108 X |

FOREIGN PATENTS 27,581 of 1913 Great Britain.

REUBEN FRIEDMAN, *Primary Examiner.*

D. M. RIESS, *Assistant Examiner.*